United States Patent [19]
Collins

[11] 4,086,452
[45] Apr. 25, 1978

[54] ISOLATING SWITCH SHUTTER ASSEMBLY FOR HIGH VOLTAGE MOTOR STARTER

[75] Inventor: James D. Collins, Elma, N.Y.

[73] Assignee: Westinghouse Electric Corporation, Pittsburgh, Pa.

[21] Appl. No.: 672,897

[22] Filed: Apr. 2, 1976

[51] Int. Cl.² ............................................. H01H 9/22
[52] U.S. Cl. ............................... 200/50 AA; 361/337; 361/345
[58] Field of Search ...................... 260/50 AA; 337/7; 361/335–337, 338, 339, 343–345

[56] References Cited

U.S. PATENT DOCUMENTS

| | | | |
|---|---|---|---|
| 2,673,260 | 3/1954 | Lester et al. | 200/50 AA |
| 2,894,085 | 7/1959 | Wilson | 200/50 AA |
| 3,002,129 | 9/1961 | Mueller | 361/337 |
| 3,015,756 | 1/1962 | Kreekon et al. | 200/50 AA X |
| 3,213,222 | 10/1965 | Finley et al. | 200/50 AA |
| 3,219,771 | 11/1965 | Umphrey | 200/50 AA |
| 3,264,432 | 8/1966 | Hodgson et al. | 337/7 |
| 3,264,433 | 8/1966 | Clark, Jr. et al. | 337/7 |
| 3,610,850 | 10/1971 | Eichelberger | 200/50 AA |
| 3,749,862 | 7/1973 | Wilson et al. | 200/50 AA |
| 3,778,568 | 12/1973 | Wilson | 200/50 AA |
| 3,920,939 | 11/1975 | Ciboldi et al. | 200/50 AA |

*Primary Examiner*—James R. Scott
*Attorney, Agent, or Firm*—L. P. Johns

[57] ABSTRACT

A high voltage motor controller which is capable of accepting a modular plug-in unit comprising a power fuse assembly and isolating switch apparatus of a draw-out type, and characterized by a safety shutter mechanism for mechanically driving an isolating shutter between open and closed positions, to prevent accidental access to the energized stationary line stabs.

4 Claims, 4 Drawing Figures

ISOLATING SWITCH SHUTTER ASSEMBLY FOR HIGH VOLTAGE MOTOR STARTER

BACKGROUND OF THE INVENTION

1. Field of the Invention

This invention relates to apparatus including a single compartment cabinet housing having electrical terminal assembly mounted on the back wall of the cabinet to engage plug-in modular assemblies including a power fuse assembly, a contactor assembly and an isolating switch assembly of a high voltage starter.

2. Description of the Prior Art

A high voltage starter is employed for starting and controlling AC motors with voltages ranging from 2500 to 5000 volts. This industrial type controller is designed to be installed, operated, and maintained by adequately trained workmen. For safety reasons, high voltage motor controllers require an isolating switch to provide a mechanical opening of the power circuit to permit maintenance. It is expedient to provide a drawout type isolating switch, such as disclosed in U.S. Pat. Nos. 3,264,431 and 3,264,433, and include an insulated safety shutter which automatically closes access to energized stationary line stabs. Safety shutters of some prior constructions are closed by gravity and are thereby easily or accidentally opened. Accordingly, there has been a need for an insulating shutter mechanism which prevents accidental access to the energized stationary line stabs by providing for automatic closing of access to the stabs when the isolating switch is open or withdrawn from the starter.

Associated with the foregoing has been another problem. On starters of prior construction using the isolating switch, a rear barrier, shutter, and shutter operating mechanism were part of the isolating switch. When the isolating switch was removed from the enclosure, the line stabs and vertical bus connections were completely exposed. A common practice was to display a "Danger — High Voltage" sign and latch the doors closed. If maintenance work was required within the starter, the main horizontal bus had to be deenergized, thus shutting down all the starters in the lineup being fed from that main bus bar.

SUMMARY OF THE INVENTION

In accordance with this invention it has been found that the foregoing problems may be overcome by providing an isolating switch as well as a shutter mechanism including a rear barrier and shutter operating lever which are part of the starter structure and remain intact when the isolating switch is withdrawn from the starter structure. This invention provides a switching apparatus comprising a cabinet housing having a rear panel, first and second electrical terminal contact assemblies mounted in spaced locations on the interior surface of the rear panel. Electrical conductor means are operatively connected between the terminal contact assemblies and comprise an isolating switch structure. The isolating switch structure includes movable contact members engageable with the first terminal contact assembly. Said structure is movable between retracted and advanced positions of the rear panel. A carriage is on said structure and the movable contact members are mounted on the carriage. The carriage is movable between open and closed positions of the movable contact members and the first electrical terminal contact assembly. A safety shutter is located between the movable contact members and said first assembly when the carriage is in the open contact position. Operating means comprising a shutter lever are operatively connected to the carriage for moving the safety shutter, and comprising a cam on the carriage and a cam follower on the lever. The cam includes a camming surface inclined at an angle to the direction of travel of the carriage. The cam also includes a pair of spaced camming surfaces disposed at opposite sides of the cam follower. The operating means are effective to move the shutter to the retracted position when the carriage moves to the closed position. The switch apparatus also comprises latch means for latching the shutter in the closed position when the carriage is the open position, which lever is disengaged from the shutter when the isolation switch structure is moved to the advanced position.

The advantage of this invention is that the shutter and shutter operating lever are a part of a starter structure rather than the isolating switch and therefore are not removed with the isolating switch when the latter is withdrawn from the starter.

DESCRIPTION OF THE PREFERRED EMBODIMENT

Although the device of this invention may be used in various types of switching apparatus, one type to which it is particularly adapted is that shown in U.S. Pat. No. 3,264,431 to which reference is made. In that patent, a complete description of the operating parts of switching apparatus employing a fuse as a movable contact is provided, for which reason the description is limited herein to only the essential parts.

Figure 1:
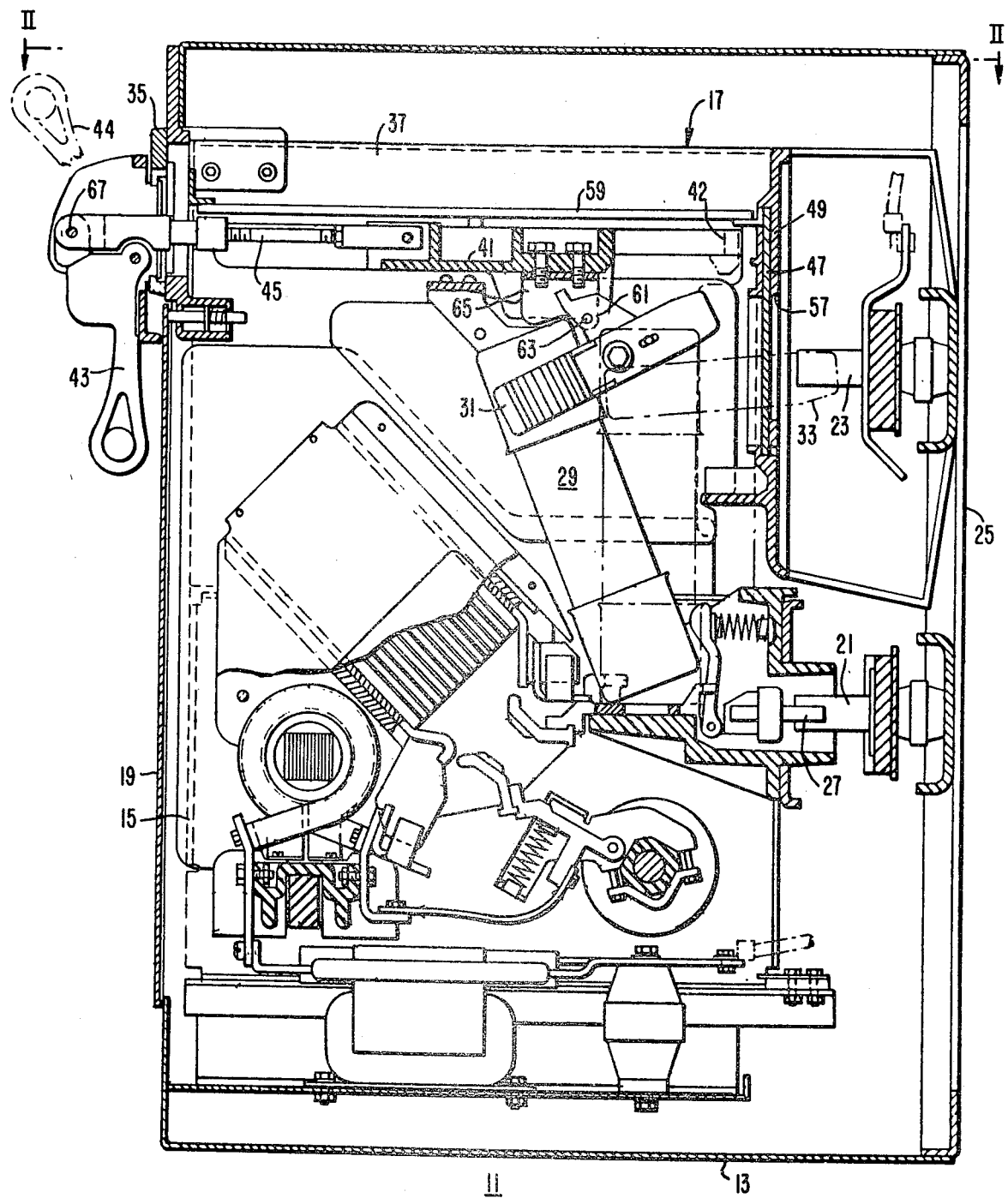
FIG. 1 is a vertical sectional view of a compact switching apparatus employing fuses as movable contacts.

In FIG. 1 a high voltage motor starter apparatus is generally indicated at 11 and it comprises a cabinet housing 13 in which high-voltage modular plug-in assemblies are disposed. The plug-in assemblies comprise a contactor unit 15 and an isolating switch unit 17, each being slidably removable from the cabinet housing to which access is provided by a hinged access door 19. Electrical terminal assemblies 21, 23 are mounted on the interior surface of a rear panel 25 which electrically engage the units 15 and 17, respectively. The three-phase output power developed by the high voltage motor starter 11 is conducted from the load terminal assemblies 21 through contact clips 27, power fuses 29, conductive fuse clips 31 and stab contacts 33, and line terminal assemblies 23.

The isolating switch unit 17 comprising a frame including a front panel 35, a pair of side plates 37, 39, a tray or carriage 41, a handle 43, and a connecting rod 45 extending between the handle and the carriage. The isolating switch unit 17 has a two-fold function including making and breaking contact between the stab contacts 33 and the line terminal assemblies 23. For that purpose the power fuses 29 are moved from the solid line position (FIG. 1) to the broken line position thereof with the stab contacts 33 shown in broken line contact with the terminal assemblies 23. The other function of the isolating switch unit 17 is to automatically open and close a safety shutter 47 which blocks access to the several line terminal assemblies 23 when the stab contacts 33 are in the retracted (solid line) positions as shown in FIG. 1, as well as when the isolating switch unit 17 is completely removed from the cabinet housing 13.

Figure 2:
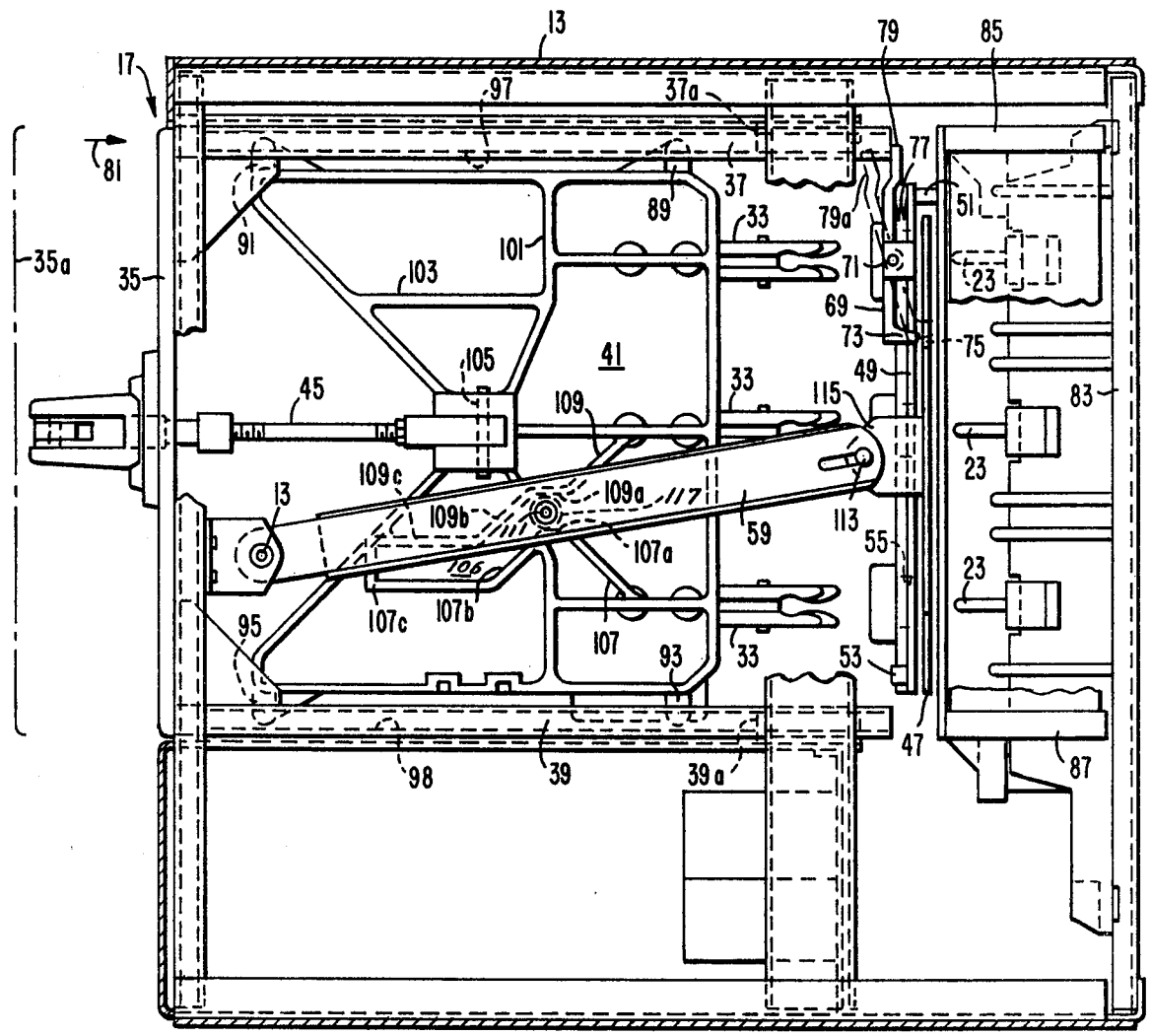
FIG. 2 is a horizontal sectional view taken on the line II—II of FIG. 1, with the contacts in the open position.

As shown in FIGS. 1 and 2 a barrier or wall 49 consisting of electrically insulating material is mounted on spaced supports 51, 53 extending from the rear wall of the housing. Like the shutter 47, the barrier 49 consists of electrically insulating material and includes a plurality of spaced apertures 55 (FIG. 1) which are aligned with the spaced line terminal assemblies 23. The shutter 47 also includes apertures 57 which are spaced by a distance corresponding to the apertures 55. In the closed position of the shutter the apertures 57 of the shutter are unaligned with the apertures 55 of the barrier so that the surface of the shutter covers the apertures 55 and prevents inadvertent access to the line terminal assemblies 23. The shutter 47 is slidably mounted in surface-to-surface contact with the barrier 49 and is movable between open and closed positions by operating means including a lever 59 as shown in FIG. 2.

As shown in FIG. 1 the fuse clips 31 are suspended on mounting brackets 61 each of which in turn is pivotally mounted by a pin 63 on a support bracket 65 which is secured to the undersurface of the carriage 41. When the carriage 41 moves to the advanced (broken line) position 42, the power fuses 29 rotate about their lower ends and move with the fuse clips 31 through the barrier 49 and shutter 47 to engage the terminal assemblies 23. Conversely, when the carriage 41 is retracted the fuses 29 and contacts 33 move to the solid line position (FIG. 1) and the shutter 47 moves to the closed position. In the retracted position of the carriage 41, the handle 43 is in the downwardly extending position and the outer end of the connecting rod 45 is secured to the handle at pivot pin 67. To move the carriage to the advanced position and thereby open the shutter to engage the contacts 23, 33, the handle 43 is moved to the broken line position 44, in a manner set forth in U.S. Pat. No. 3,264,431, whereby the rod 45 advances the carriage 41.

The carriage 41 is slidably mounted between side plates 37, 39. In the retracted position, the carriage 41 holds the stab contacts 33 on the side of the barrier or wall 49 opposite the terminal assemblies 23 with the safety shutter 47 in the closed position for preventing movement of the stab contacts 33 through the aperture 57 of the barrier. As shown in FIG. 2 a latch 69 is pivotally mounted at 71 on the barrier 49 for locking the safety shutter 47 in the closed position. The latch 69 includes a turned-in portion 73 which in the latched position extends through an opening 75 in the shutter to prevent manual movement of the shutter out of the latched position shown in FIG. 2 by the broken line position 79a. The latched position is maintained by a coil spring 77. In the latched position an opposite end portion 79 of the latch is disposed in the broken line position 79a and disposed in the path of travel of the side plates 37. When the isolating switch unit 17 is withdrawn or retracted such as to the broken line position 35a (FIG. 2) the inner ends of the side plates 37 and 39 are located at the broken line position 37a and 39a respectively. As the isolating switch unit 17 is pushed further into the cabinet housing 13, as indicated by the arrow 81, the end 37a of side plate 37 moves the latch end portion 79 to rotate the latch 69 to the unlatched position and out of the opening 75. Accordingly, the safety shutter 47 is free to move to the right (FIG. 2) upon subsequent advance of the carriage 41 toward the barrier 49.

The barrier assembly including the barrier 49 and a safety shutter 47 are mounted on a back wall 83 of the cabinet housing 13 by spaced brackets 85, 87, so that the barrier assembly is permanently located within the cabinet housing and is not removable with the isolating switch unit 17 which is a condition of other isolating switch units of prior art construction. Accordingly, the advantage of the latch 69 is that when the isolating switch unit 17 is removed from the cabinet housing, maintenance personnel cannot inadvertently move the safety shutter 47 aside to obtain access to the terminal assemblies 23 without first manually unlatching the latch 69.

The tray or carriage 41 (FIG. 2) is a substantially rectangular and includes a pair of laterally disposed members 89 and 91 on the left side and members 93, 95 on the right side (FIG. 2) with the members 89 and 91 disposed in a track-like groove 97 in the side plate 37 and the members 93 and 95 extending into a similar groove 98 in the side plate 39. The carriage 41, consisting of an electrically insulating material, such as a resin (glass filled polyester), includes reinforcing ribs 101, 103 and is connected to the inner end of the connecting rod 45 by a pin 105. The carriage 41 also includes a cam 106 including cam guide walls 107 and 109 for guiding following pin 111 which extends downwardly from the undersurface of the lever 59 and between the guide walls. The outer end of the lever 59 is pivotally attached to the frame of the cabinet housing at pivot pin 13 and the inner end is pivotally attached by pin 113 on a bracket 115 extending from the safety shutter 47. The cam 106 moves the lever and the safety shutter 47 with it through an arc having limits shown in FIGS. 2 and 3. The upper ends of the guide walls 107, 109 (FIG. 2) diverge outwardly and serve thereby as a funnel for moving the pin 111 into the cam 106. As the carriage 41 is moved by the connecting rod 45 from the retracted position of FIG. 2 to the advanced position of FIG. 3, the pin 111 follows the cam channel formed by the cam surfaces 107, 109. The pin 111 first enters a cam portion between guide walls 107a, 109a having an access substantially parallel to the direction of movement of the carriage 41. As the carriage 41 continues moving inwardly the pin 111 moves into a cam portion defined by the walls 107b, 109b and having an axis inclined at an angle, such as 45°, to the direction of movement of the carriage 41, whereby the lever 59 is moved clockwise to the position shown in FIG. 3 and to thereby move the shutter 47 to the open position for the advancing stab contacts 33. Further advance of the carriage 41 results in the pin 111 moving into the remaining portion of the cam defined by the side walls 107c, 109c having an axis parallel to the direction of movement of the carriage, thereby completing the closing of the circuit through the terminal assemblies 23 and the stab contacts 33.

Figure 3:
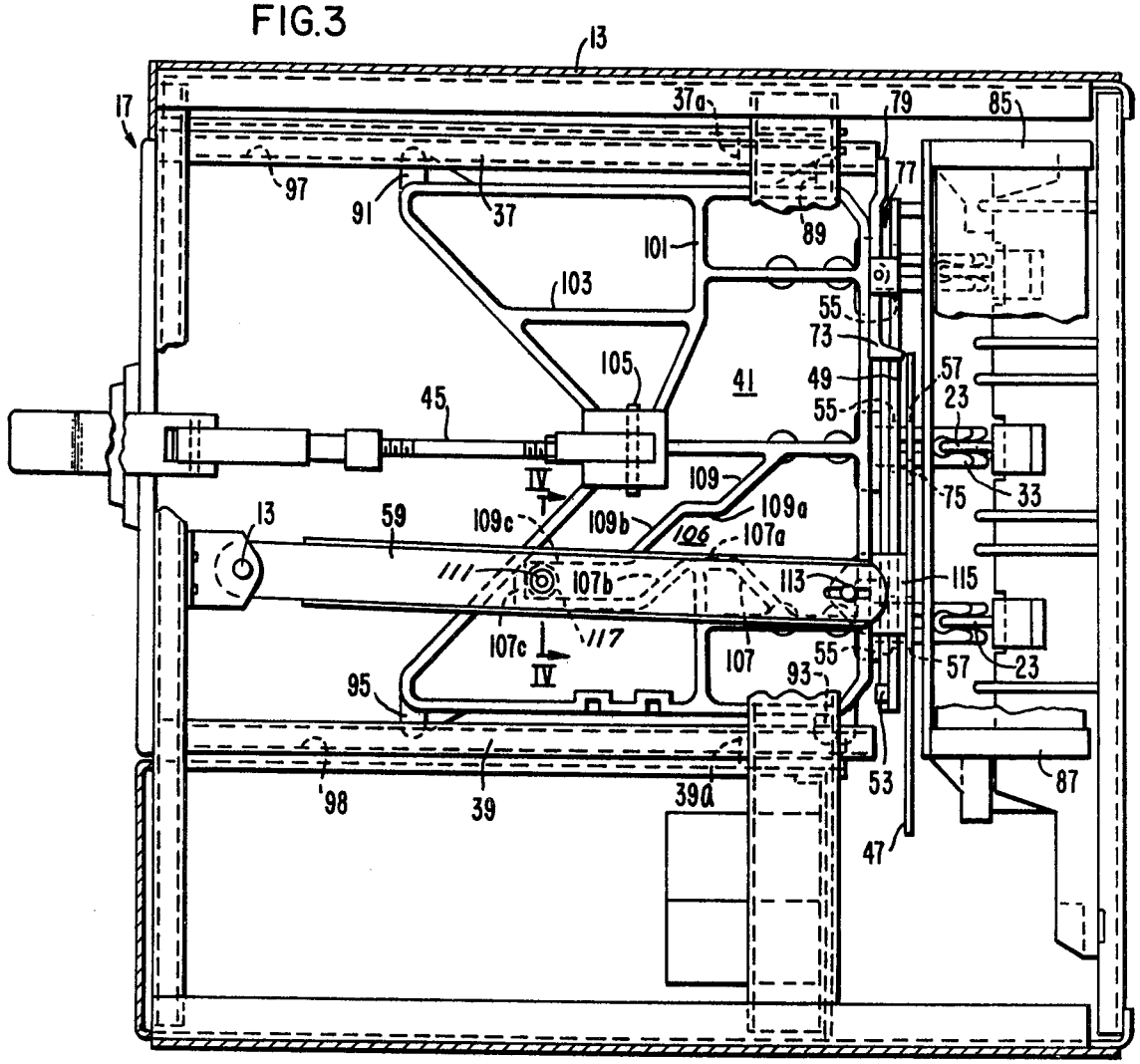
FIG. 3 is a horizontal sectional view corresponding to FIG. 2, showing the contacts in the closed position; and, FIG. 4 is a fragmentary vertical sectional view taken on the line IV—IV of FIG. 3.
Figure 4:
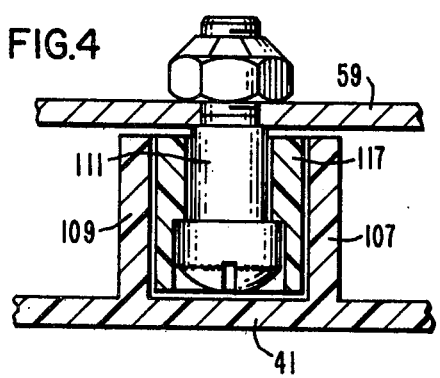

Conversely, withdrawal of the carriage 41 from the closed position of the contacts, as shown in FIG. 3, to the retracted position of FIG. 2 causes the pin 111 to move in the reverse direction through the cam 106. To facilitate movement of the pin 111 a roller 117 is preferably mounted on the pin 111 as shown in FIG. 4.

The safety barrier mechanism of this invention has the advantage of being part of the starter structure and is not removable with the isolating switch. The sliding carriage 41 comprises a molded-in cam 106 which engages a roller 117 on the shutter operating lever 59. As the isolating switch handle 48 is moved from ON to OFF or vice versa, the carriage 41 moves back and forth, driving the shutter operating lever 59 which properly position the shutter 47. All operating parts automatically engage when the isolating switch 17 is replaced. If the shutter 47 happens to be open when the switch is installed, the cam 106 automatically closes the shutter 47 and then reopens it before the contacts 33 engage the terminal assemblies 23. When the carrier 41 and contacts 33 are retracted, the isolating switch 17 is in the OFF position. Upon reinsertion of the switch the shutter latch 79 is released during the last inch of travel as the carriage 41 is completely inserted. The operating handle 43 is then free to move the sliding carriage 41 and the contacts 23 into the ON position. The sliding carriage 41 is movable on the side plates 37, 39 regardless of location of the contractor unit 17 in the housing 17.

If the carriage 41 is in the ON position as the unit 17 is inserted, the shutter latch 69 prevents the shutter lever from moving the shutter 47 open and the switch cannot be completely inserted. Thus the cam 106 is jammed on the lever 59 and the contacts cannot be moved to the closed position. Moreover, if during maintenance, the shutter latch 69 is defeated and the shutter 47 is left open, insertion of the isolating switch 17 immediately closes the shutter. Further insertion of the isolating switch 17 then releases the shutter latch 69 in the regular manner, so that the shutter 47 is free to open when the operating handle is moved to the ON position.

What is claimed is:

1. A switching apparatus comprising a cabinet housing having a rear panel, first and second electrical terminal contact assemblies mounted in spaced locations on the interior surface of the rear panel, electrical conductor means for providing a circuit between the first and second terminal contact assemblies and comprising a movable contact member, the isolating switch structure comprising track means, said structure being movable between retracted and advanced positions of the rear panel, a carriage mounted on the track means and movable between retracted and advanced positions of the rear panel and comprising a cam, the movable contact member being mounted on the carriage and movable by the carriage between open and closed positions with the first terminal contact assembly corresponding to the retracted and advanced positions of the carriage, manual means including handle means connected to the carriage for moving the carriage between the retracted and advanced positions, a safety shutter between the movable contact member and said first terminal-contact assembly when the carriage is in the open contact position, operating means for moving the safety shutter to a retracted position when the carriage moves to the closed contact position, the operating means comprising a shutter lever pivotally mounted at one end at a fixed location and connected at the other end to the safety shutter, a cam follower on the lever, the cam comprising a pair of spaced lineal camming surfaces disposed on opposite sides of the cam follower and extending at an angle inclined to the direction of movement of the carriage.

2. The switch apparatus of claim 1 in which latch means are pivotally mounted with a portion in the path of travel of the isolating switch structure for latching the shutter in the closed position when said switch structure is in the retracted position.

3. The switch apparatus of claim 2 in which the latch means comprises a lever that is disengaged from the shutter when the isolation switch structure is moved to the advanced position.

4. The switch apparatus of claim 1 in which the carriage consists of a molded electrically insulating material, and the cam is an integral mold portion thereof.

* * * * *